United States Patent
Chen et al.

(10) Patent No.: US 9,858,494 B2
(45) Date of Patent: Jan. 2, 2018

(54) SYSTEMS AND METHODS FOR ANALYZING RENDERED CONTENT

(71) Applicant: Facebook, Inc., Menlo Park, CA (US)

(72) Inventors: Chih-Tang Chen, Palo Alto, CA (US); Xiaojun Liang, San Jose, CA (US); Maher Afif Saba, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/980,446

(22) Filed: Dec. 28, 2015

(65) Prior Publication Data
US 2017/0185861 A1    Jun. 29, 2017

(51) Int. Cl.
*G06K 9/46* (2006.01)
*G06K 9/62* (2006.01)

(52) U.S. Cl.
CPC ......... *G06K 9/4652* (2013.01); *G06K 9/6212* (2013.01)

(58) Field of Classification Search
CPC .......................... G06K 9/4652; G06K 9/6212
See application file for complete search history.

(56) References Cited

U.S. PATENT DOCUMENTS

| | | | |
|---|---|---|---|
| 2007/0053557 A1* | 3/2007 | Cahill | G06T 7/0012 382/128 |
| 2011/0202847 A1* | 8/2011 | Dimitrov | G06F 3/0481 715/738 |
| 2013/0083978 A1* | 4/2013 | Frederick | G06F 19/3443 382/128 |
| 2014/0089424 A1* | 3/2014 | Oztaskent | H04L 51/08 709/206 |
| 2014/0241635 A1* | 8/2014 | Ruppaner | G06K 9/00228 382/197 |
| 2014/0247870 A1* | 9/2014 | Mertens | H04N 19/46 375/240.08 |
| 2014/0324943 A1* | 10/2014 | Antipa | H04L 67/42 709/203 |
| 2015/0026239 A1* | 1/2015 | Hofmann | H04L 67/1095 709/203 |
| 2015/0106384 A1* | 4/2015 | Go | G06F 8/77 707/748 |

* cited by examiner

*Primary Examiner* — Yubin Hung
(74) *Attorney, Agent, or Firm* — Sheppard Mullin Richter & Hampton LLP

(57) ABSTRACT

Systems, methods, and non-transitory computer-readable media can obtain data corresponding to a first content item. The first content item can be rendered for display. The first content item can be presented through a display interface. A screenshot image of the display interface can be captured while the first content item is being presented. A determination is made whether the first content item was incompletely rendered based at least in part on the screenshot image.

19 Claims, 7 Drawing Sheets

SYSTEMS AND METHODS FOR ANALYZING RENDERED CONTENT

FIELD OF THE INVENTION

The present technology relates to the field of content presentation. More particularly, the present technology relates to techniques for analyzing rendered content.

BACKGROUND

Today, people often utilize computing devices (or systems) for a wide variety of purposes. Users can use their computing devices to, for example, interact with one another, access content, share content, and create content. In some cases, content items may be provided by members of a social network or from various content publishers. Content items may include text and media, such as images, videos, and audio. Such content items may be published to a social networking system and be made available for access by the members of the social networking system.

SUMMARY

Various embodiments of the present disclosure can include systems, methods, and non-transitory computer readable media configured to obtain data corresponding to a first content item. The first content item can be rendered for display. The first content item can be presented through a display interface. A screenshot image of the display interface can be captured while the first content item is being presented. A determination is made whether the first content item was incompletely rendered based at least in part on the screenshot image.

In an embodiment, upon determining that the first content item was rendered incompletely, the systems, methods, and non-transitory computer readable media are configured to generate a report describing the first content item, the report including at least the screenshot image and a Uniform Resource Locator (URL) referencing the first content item.

In an embodiment, the systems, methods, and non-transitory computer readable media are configured to determine that a percentage of white pixels in the screenshot image satisfies a threshold percentage and to determine that the first content item was incompletely rendered based at least in part on the threshold percentage of white pixels.

In an embodiment, the systems, methods, and non-transitory computer readable media are configured to determine that a percentage of black pixels in the screenshot image satisfies a threshold percentage and to determine that the first content item was incompletely rendered based at least in part on the threshold percentage of black pixels.

In an embodiment, the systems, methods, and non-transitory computer readable media are configured to determine that a percentage of colored pixels in the screenshot image satisfies a threshold percentage and to determine that the first content item was incompletely rendered based at least in part on the threshold percentage of colored pixels.

In an embodiment, the systems, methods, and non-transitory computer readable media are configured to determine a first percentage of white pixels, a second percentage of black pixels, and a third percentage of colored pixels in the screenshot image, determine a score based at least in part on the first percentage, the second percentage, and the third percentage, and to determining that the first content item was incompletely rendered based at least in part on the score.

In an embodiment, the systems, methods, and non-transitory computer readable media are configured to identify a largest region in the screenshot image including only pixels of a certain color and to determine that the first content item was incompletely rendered based at least in part on a size of the largest region.

In an embodiment, the systems, methods, and non-transitory computer readable media are configured to identify at least one error message in the screenshot image and to determine that the first content item was incompletely rendered based at least in part on the error message.

In an embodiment, the systems, methods, and non-transitory computer readable media are configured to identify a source of the first content item and to determine that the source has published at least one other content item that was previously determined to be incompletely rendered for display.

In an embodiment, the systems, methods, and non-transitory computer readable media are configured to obtain one or more thresholds corresponding to the source, the thresholds to be used for determining whether the first content item is incorrectly rendered.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
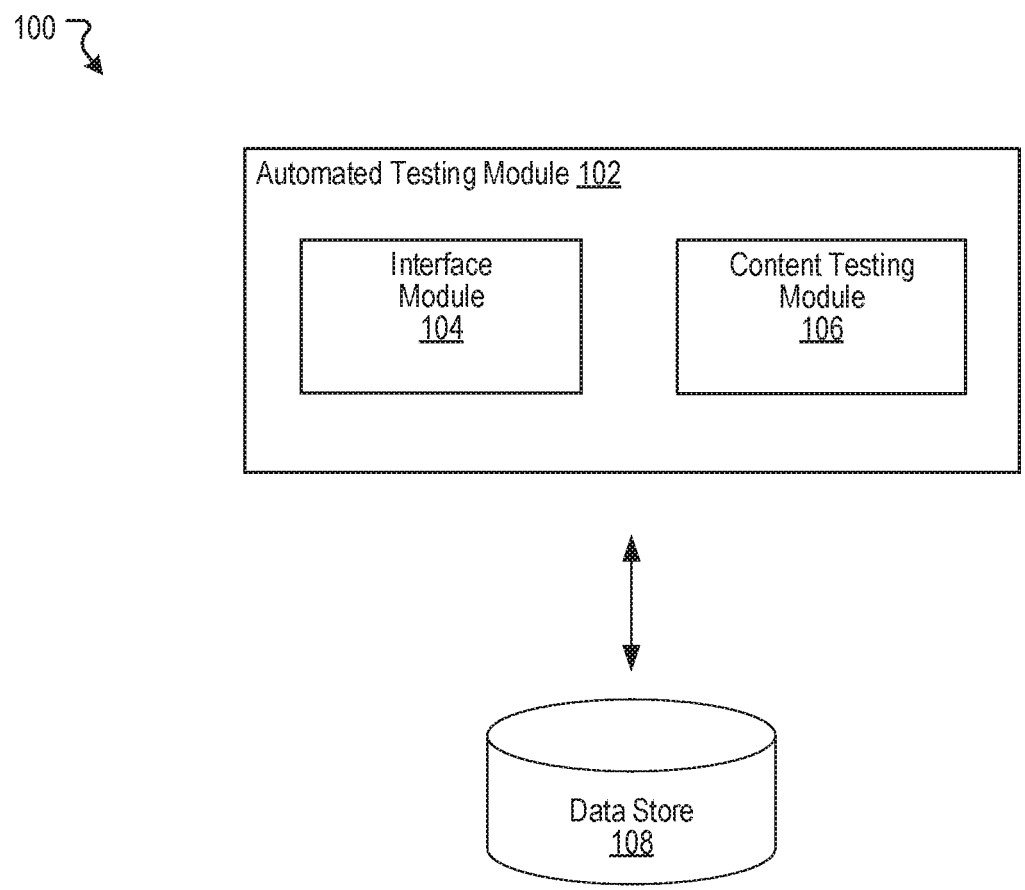
FIG. 1 illustrates an example system including an example automated testing module configured to analyze rendered content, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Analyzing Rendered Content

Today, people often utilize computing devices (or systems) for a wide variety of purposes. Users can use their computing devices to, for example, interact with one another, access content, share content, and create content. In some cases, content items may be provided by members of a social network or from various content publishers. Content items may include text and media, such as images, videos, and audio. Such content items may be published to a social networking system and be made available for access by the members of the social networking system.

In various embodiments, a user can access the social networking system, for example, through a software application running on a computing device. In such embodiments, the user can use an interface provided by the software application to interact with the various content items that are available through the social networking system. In some instances, the content items may include links (e.g., hyperlinks) that reference content available from computing resources that are external to the social networking system. In one example, a content item posting in the social networking system may include a portion, or snippet (e.g., title, summary, text excerpt, images, frames, etc.), of the content item and this snippet can link to the respective content item in full. Here, the user can select the snippet of the content item to access the content item in its entirety. In one example, the content item may be a web page corresponding to a news article that is hosted, or provided, by a content publisher system that is external to the social networking system. Once the user selects (e.g., accesses) the snippet of the news article, the news article may be presented through the interface in its entirety. In some embodiments, the software application running on the computing device includes an in-app browser that is configured to render external content items to be presented through the interface. The in-app browser can be configured to render and present various types of content (e.g., markup languages such as HTML, executable code such as JavaScript, images, videos, etc.). In some instances, the in-app browser may fail to render certain types of content. For example, a web page may include executable code that causes the in-app browser to incorrectly render, or not render at all, at least a portion of the web page. In such instances, the rendering issues will generally go unnoticed unless they are documented. Further, documenting such rendering issues can be important for debugging purposes so that the in-app browser can be reconfigured to correctly render such content in the future. Under conventional approaches, however, such rendering issues are likely to go unnoticed unless they are manually documented by an individual (e.g., quality assurance personnel). Since limited resources may be available for such manual documentation, many rendering issues can go undocumented under conventional approaches. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, an automated testing tool running on a computing device can be utilized for identifying and documenting rendering issues that result when rendering content through the in-app browser. The automated testing tool can be configured to access, through the social networking system, various content item postings that include links to external content (e.g., web pages). When accessing such content item postings, the automated testing tool can select the link to cause the external content to be rendered in the in-app browser running on the computing device. Once the in-app browser renders and presents the external content through a display screen of the computing device, the automated testing tool can capture a screen shot of the rendered content being presented. These captured screen shots can be analyzed to identify incorrectly rendered content. The external content may be incorrectly rendered, for example, if only a portion of the content is presented through the in-app browser (e.g., half of the web page is blank) or if none of the content is presented through the in-app browser (e.g., the entire web page is blank). In one example, a screen shot of a rendered web page that includes a threshold percentage (e.g., 70 percent) of white pixels may be identified as incorrectly rendered content. In some embodiments, a report describing the incorrectly rendered web page, along with a link, or Uniform Resource Locator (URL), to the web page can be sent to quality assurance personnel for debugging purposes. As a result, the automated testing tool can provide a more efficient approach for analyzing a large number of content item postings for the purposes of identifying and documenting incorrectly rendered content in the in-app browser.

FIG. 1 illustrates an example system 100 including an example automated testing module 102 configured to analyze rendered content, according to an embodiment of the present disclosure. As shown in the example of FIG. 1, the automated testing module 102 can include an interface module 104 and a content testing module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the automated testing module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the automated testing module 102 can be implemented, in part or in whole, as software running on one or more computing devices or systems, such as on a user or client computing device. In one example, the automated testing module 102 or at least a portion thereof can be implemented as or within an application (e.g., app), a program, or an applet, etc., running on a user computing device or a client computing system, such as the user device 610 of FIG. 6. In another example, the automated testing module 102 or at least a portion thereof can be implemented using one or more computing devices or systems that include one or more servers, such as network servers or cloud servers. In some instances, the automated testing module 102 can, in part or in whole, be implemented within or configured to operate in conjunction with a social networking system (or service), such as the social networking system 630 of FIG. 6.

The automated testing module 102 can be configured to communicate and/or operate with the at least one data store 108, as shown in the example system 100. The at least one data store 108 can be configured to store and maintain various types of data, such as content items and information identifying sources (e.g., domain names, web sites, web pages, content publishers, users, etc.) that previously published content items that were determined to be incorrectly rendered by the in-app browser that is utilized by the interface module 104. In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. In some embodiments, the at least one data store 108 can store various metrics relating to page responsiveness for various pages available through the social networking system.

The automated testing module 102 can utilize the interface module 104 to access and render content items. The interface module 104 can be configured to provide an interface (e.g., graphical user interface) through which rendered content items can be presented and accessed. More details regarding the interface module 104 will be provided below with reference to FIG. 2. The content testing module 106 can be configured to analyze content that is rendered using the interface module 104 to determine whether the content was rendered correctly. More details regarding the content testing module 106 will be provided below with reference to FIG. 3.

Figure 2:
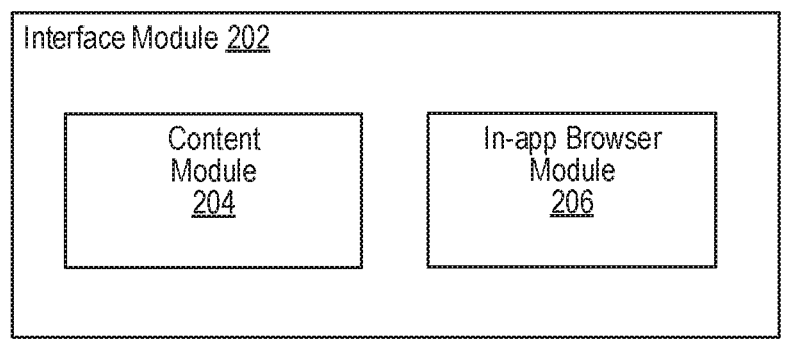
FIG. 2 illustrates an example of an interface module configured to provide an interface for accessing content items, according to an embodiment of the present disclosure.

FIG. 2 illustrates an example of an interface module 202 configured to provide an interface for accessing content items, according to an embodiment of the present disclosure. In some embodiments, the interface module 104 of FIG. 1 can be implemented as the interface module 202. As shown in FIG. 2, the interface module 202 can include a content module 204 and an in-app browser module 206.

The interface module 202 can be configured to provide an interface (e.g., graphical user interface) through which content items (e.g., images, videos, audio files, etc.) can be presented. For example, the interface can be provided by a software application running on a computing device and through a display screen associated with the computing device. In various embodiments, a content module 204 is configured to provide content items to be presented through the interface. For example, the content module 204 can provide content items that were published by various entities. In some embodiments, the content module 204 provides content items that were posted to a social networking system, for example, by users of the social networking system and/or from various content publishers. In some instances, content items provided by the content module 204 can include links (e.g., hyperlinks) to external content. In some embodiments, the content module 204 provides a portion, or snippet (e.g., including a title, summary, text excerpt, images, frames, etc.) of the content item, and this snippet can link to external content, which may include the content item in its entirety. Typically, the external content may be a web page that is hosted, or provided, by a content publisher system that is external to the social networking system. The web page can be composed of a markup language (e.g., HTML) and also may include content (e.g., images, videos, audio, etc.) and executable code (e.g., JavaScript) to be interpreted when the web page is being rendered.

The in-app browser module 206 can be configured to render and present external content through the interface. For example, a content item being presented through the interface may include a link to a web page. In this example, when the link to the web page is selected, the in-app browser module 206 can be configured to obtain, or download, data describing the web page (e.g., HTML, content associated with the web page, and/or any executable code associated with the web page, etc.). Further, the in-app browser module 206 can be configured to render the web page for presentation through the interface. In various embodiments, such rendering can involve, among other things, parsing any markup language (e.g., HTML) associated with the web page, executing code (e.g., JavaScript) associated with the web page, and/or formatting the layout and style of the web page, to name some examples.

In various embodiments, the interface module 202 can be utilized by a content testing module (e.g., the content testing module 302 of FIG. 3) to analyze the content rendered by the in-app browser module 206. Such analysis can be used to determine whether the content was correctly rendered. A web page may be incorrectly rendered if any markup language associated with the web page is unable to be parsed, if any executable code associated with the web page is unable to be executed, and/or if the formatting of the layout or style of the web page is incorrect. In other words, content is determined to be incorrectly rendered if the content, as presented through the interface, does not appear as it was intended by the content publisher.

Figure 3:
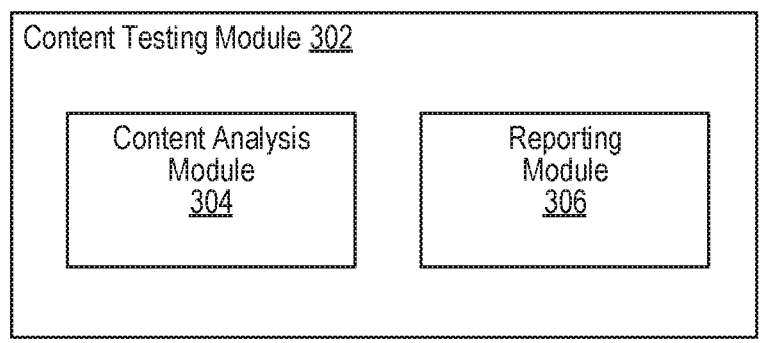
FIG. 3 illustrates an example of a content testing module configured to analyze rendered content, according to an embodiment of the present disclosure.

FIG. 3 illustrates an example of a content testing module 302 configured to analyze rendered content, according to an embodiment of the present disclosure. In some embodiments, the content testing module 106 of FIG. 1 can be implemented as the content testing module 302. As shown in FIG. 3, the content testing module 302 can include a content analysis module 304 and a reporting module 306.

The content testing module 302 can be configured to utilize the interface module 202 of FIG. 2 to access and render various content items through an interface provided by the interface module 202. As mentioned, an in-app browser can be implemented as part of the interface module 202 and this in-app browser can be utilized to render various types of content, such as web pages, through the interface. In various embodiments, the content testing module 302 operates as an automated content testing tool that can automatically access content items through the interface module 202. In one example, the content testing module 302 operates as a user (e.g., test user) of a social networking system.

When accessing a content item, the content testing module 302 can select any links to external content included in the content item. The external content can be rendered by the in-app browser and presented through the interface. In some embodiments, the content testing module 302 automatically accesses, or crawls, through the various content items that are available through the interface module 202. In some embodiments, the content testing module 302 accesses content items that were published by sources (e.g., domain names, web sites, web pages, content publishers, users, etc.) that previously published content items that were determined to be incorrectly, or incompletely, rendered by the in-app browser. In various embodiments, once a content item (e.g., external content such as a web page) rendered by the in-app browser is presented through the interface, the content analysis module 304 can be configured to capture an image (e.g., screenshot or screen capture) of the rendered content item as displayed through the interface. As a result, the image captures a rendering of the content item by the in-app browser that may be presented to a human user accessing the content item through the in-app browser running on the user's own computing device.

The content analysis module 304 can analyze the captured image to determine whether the rendered content item, as captured in the image, was or was not correctly, or completely, rendered. Any content that was rendered incorrectly, or incompletely, can be flagged and documented so that the functionality of the in-app browser can be debugged and/or improved. A content item may be incorrectly rendered in the in-app browser, for example, if the image captured of the rendered content item includes a large number, or proportion, of pixels that are of the same color. For example, in some embodiments, the content analysis module 304 can analyze an image captured of a first content item rendered in the in-app browser to determine a percentage of white pixels in the image in relation to the other pixels (e.g., pixels of varying colors) in the image. A white pixel may be a pixel that is white in color (e.g., an RGB value of #FFFFFF) or any other shade of color that generally matches the color white. In such embodiments, if the percentage of white pixels in the image satisfies a threshold value (e.g., 50 percent, 60 percent, or 70 percent), then the content analysis module 304 may determine that the content was incompletely rendered. Naturally, content items (e.g., web pages) can be created using different colors. Therefore, the content analysis module 304 can be configured to also determine whether the image contains a threshold percentage of pixels in various other colors (e.g., black, grey, etc.) depending on the implementation. In some embodiments, the content analysis module 304 determines whether the image contains a threshold percentage of colored pixels (e.g., pixels that have any color other than white, pixels that have any color other than black, or both). In such embodiments, a content item having a threshold percentage of colored pixels may not be flagged as being incompletely rendered. In some embodiments, the content analysis module 304 can determine respective proportions of white, black, and colored pixels in the image and these respective proportions can be combined to output a score that represents a likelihood of the content item represented in the image being rendered incompletely. When combining, each proportion may be assigned a respective weight. For example, the proportion of white pixels may be weighted more than the proportion of black pixels. Naturally, the approach used to combine the proportions as well as the respective weights assigned can vary depending on the implementation.

In some instances, content items may have a large number of white pixels even when rendered correctly. Thus, in some embodiments, the content analysis module 304 can convert the image into a two-dimensional pixel matrix and then determine the largest region in the image (e.g., rectangle) that contains only white pixels. If the size of this region satisfies a threshold size, then the content analysis module 304 can flag the content item as possibly being incorrectly rendered. The size may be measured in any number of ways including, for example, dimensions and/or area. In some embodiments, rather than relying solely on the colors of the pixels in the image, the content analysis module 304 can determine, in the captured image, that one or more error messages were displayed in the interface upon rendering the content. For example, the content analysis module 304 can utilize generally known approaches for text recognition to identify the error messages. In such instances, the content analysis module 304 can flag the content item as possibly being incorrectly rendered based on the error messages. Examples of such error messages can include "page cannot be loaded", "video cannot be played", etc. The content analysis module 304 can be trained to recognize variations in such error messages. In various embodiments, the content analysis module 304 can be configured to apply different thresholds and/or tests for determining whether a content item was properly rendered based on the source, or content publisher, of the content item. For example, web pages published through a certain website may include a larger proportion of pixels in a certain color. In this example, the content analysis module 304 can increase the threshold for the color when analyzing content items that were published through this website.

The reporting module 306 can be configured to document any content items that were flagged by the content analysis module 304 as possibly being incorrectly rendered. For example, for flagged content item, the reporting module 306 can send a report identifying the flagged content item as well as the image captured of the content item as rendered in the in-app browser. Depending on the implementation, the content item may be identified in the report using, for example, an identifier (e.g., numeric identifier) and/or a Uniform Resource Locator (URL) referencing the content item. The report can also include information describing the source of the content item (e.g., domain names, web sites, web pages, content publishers, users, etc.). This report can be sent to appropriate personnel for further evaluation.

Figure 4:
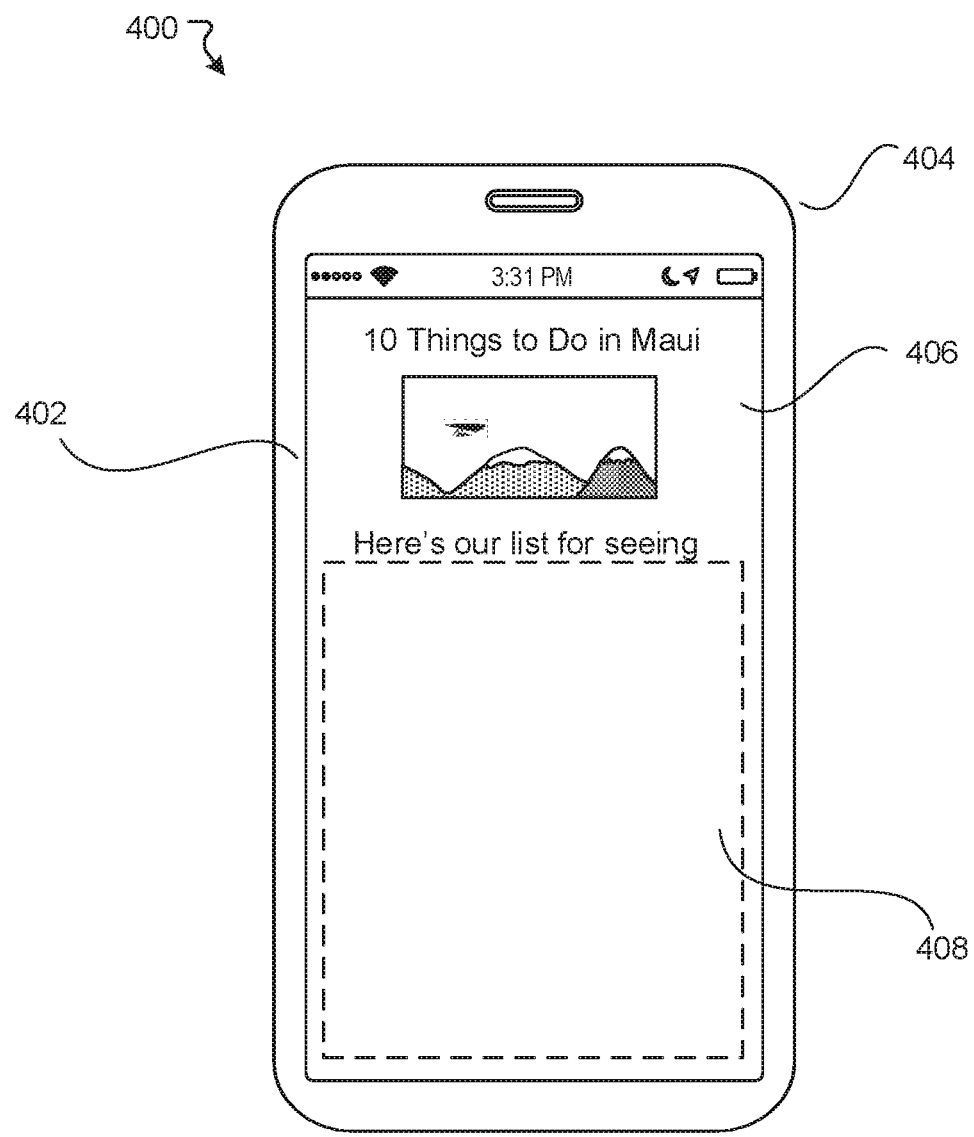
FIG. 4 illustrates an example of an interface through which a content item is being presented, according to an embodiment of the present disclosure.

FIG. 4 illustrates an example of an interface 402 through which a content item 406 (e.g., web page) is being presented, according to an embodiment of the present disclosure. The interface 402 may be presented on a display screen of a computing device 404. Further, the interface 402 may be provided through a software application (e.g., a social networking application) running on the computing device 404. The application can include an in-app browser that is configured to render the content item 406 (e.g., parse markup language associated with the content item 406, run executable code associated with the content item 406, etc.) so that the content item 406 can be presented through the interface 402.

In this example, the content item 406 is shown in the interface 402 as being improperly rendered due to there being a large portion of text 408 missing from the rendered content item 406. Such rendering issues may arise from the in-app browser being unable to render a markup language, executable code, media, etc., included in the content item. To improve functionality of the in-app browser so that such content items can be rendered properly, in various embodiments, an automated content testing tool (e.g., the automated testing module 102 of FIG. 1) can be utilized to automatically identify and document content items that are improperly rendered by the in-app browser. These documented issues can then be analyzed by various personnel, such as quality assurance personnel and/or software engineers, to identify the causes of the improper rendering of the content items, and to make adjustments to the in-app browser so that such content items can be properly rendered by the in-app browser in the future. In some embodiments, the automated content testing tool can capture an image (e.g., screenshot or screen capture) of the content item 406 as rendered through the interface 402. The automated content testing tool can analyze the captured image using various approaches, as described above, to determine whether the content item 406 was improperly rendered. In this example, the automated content testing tool can determine that the content item 406, as rendered in the interface 402, includes a large portion of white pixels 408. In some embodiments, the automated content testing tool can determine, for example, that the size of the region of white pixels 408 in the rendered content item 406 satisfies a threshold size. As a result, the automated testing tool can generate a report describing the improperly rendered content item 406 and send the report to be evaluated by appropriate personnel.

Figure 5:
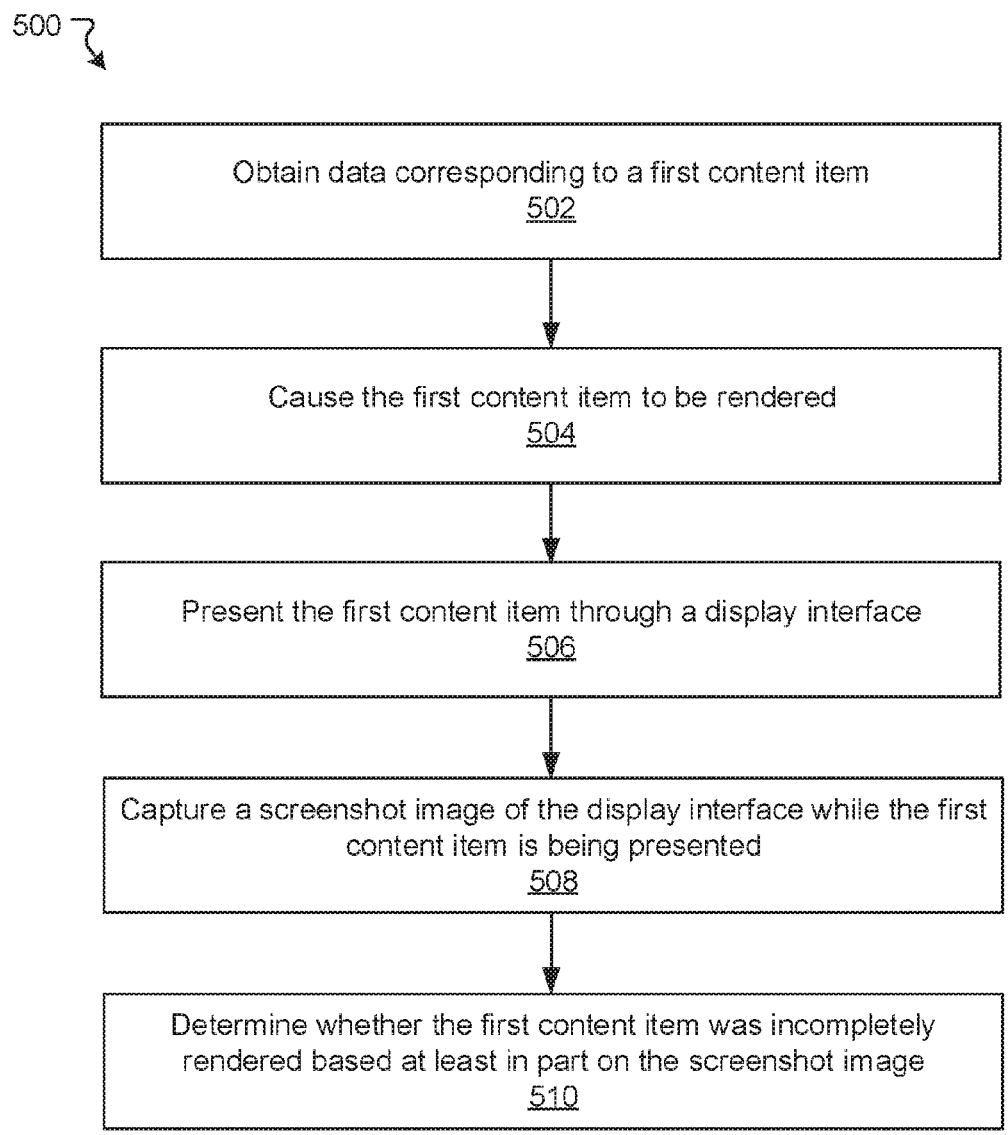
FIG. 5 illustrates an example process for analyzing rendered content, according to various embodiments of the present disclosure.

FIG. 5 illustrates an example process for analyzing rendered content, according to various embodiments of the present disclosure. It should be appreciated that there can be additional, fewer, or alternative steps performed in similar or alternative orders, or in parallel, within the scope of the various embodiments discussed herein unless otherwise stated. At block 502, data corresponding to a first content item can be obtained. At block 504, the first content item can be rendered for display. At block 506, the first content item can be presented through a display interface. At block 508, a screenshot image of the display interface can be captured while the first content item is being presented. At block 510, a determination is made whether the first content item was incompletely rendered based at least in part on the screenshot image.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
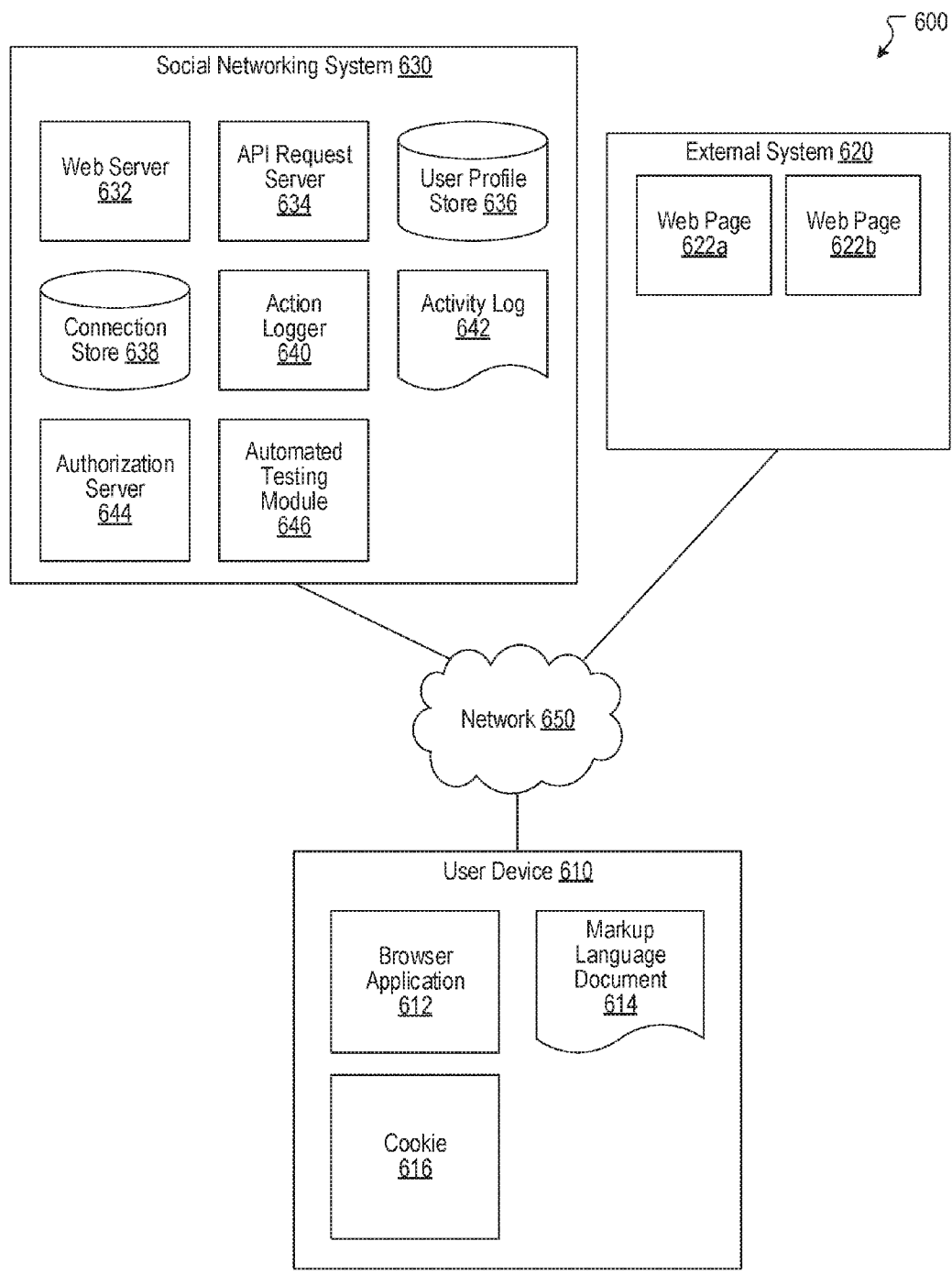
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an automated testing module 646. The automated testing module 646 can, for example, be implemented as the automated testing module 102 of FIG. 1. As discussed previously, it should be appreciated that there can be many variations or other possibilities.

Hardware Implementation

Figure 7:
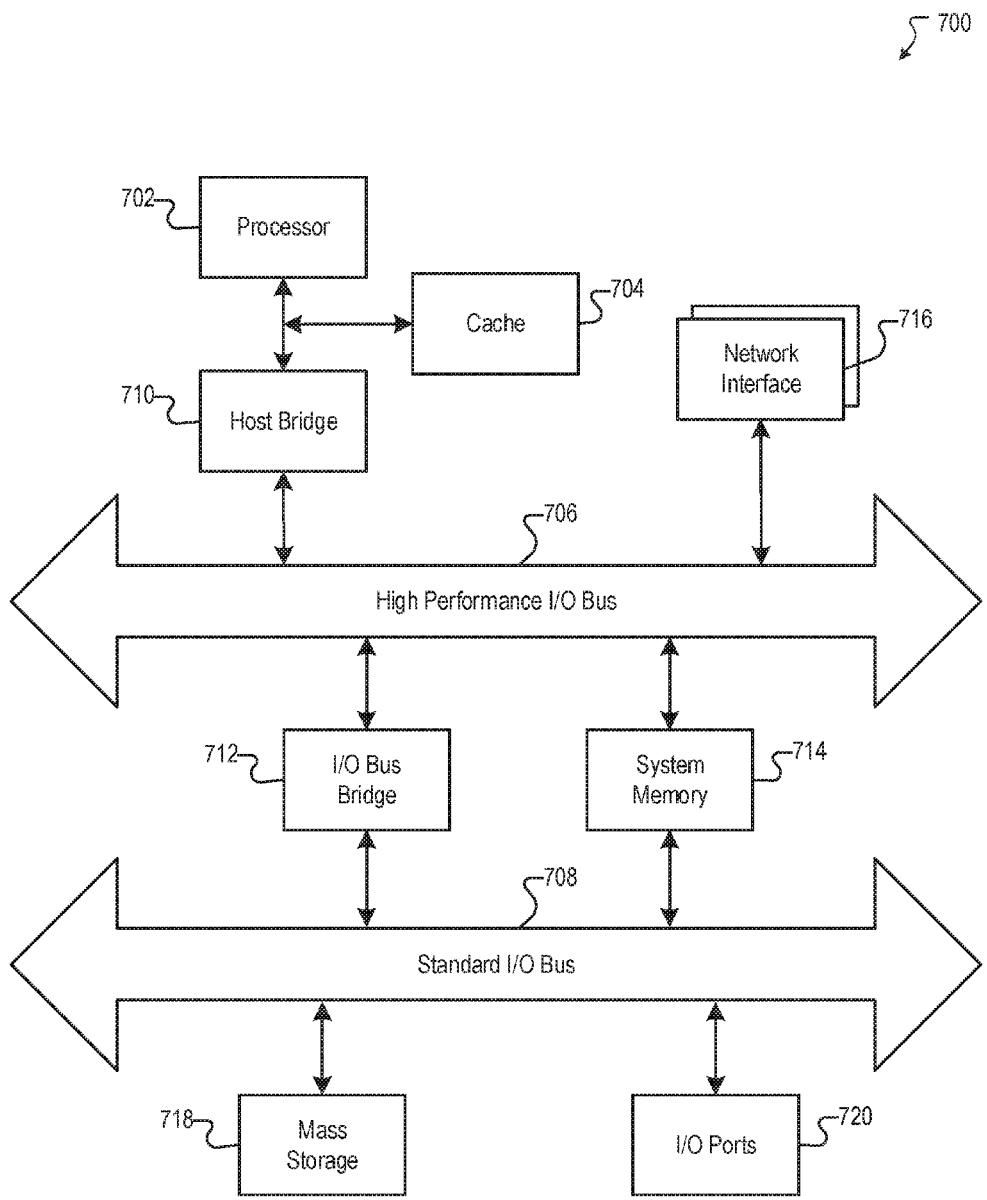
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    obtaining, by a computing system, data corresponding to a first content item;
    causing, by the computing system, the first content item to be rendered for display;
    presenting, by the computing system, the first content item through a display interface;
    capturing, by the computing system, a screenshot image of the display interface while the first content item is being presented; and
    determining, by the computing system, whether the first content item was incompletely rendered based at least in part on the screenshot image, the determining comprising:
        identifying, by the computing system, a largest region in the screenshot image including only pixels of a certain color; and
        determining, by the computing system, that the first content item was incompletely rendered based at least in part on a size of the largest region.

2. The computer-implemented method of claim 1, wherein upon determining that the first content item was rendered incompletely, the method further comprises:
    generating, by the computing system, a report describing the first content item, the report including at least the screenshot image and a Uniform Resource Locator (URL) referencing the first content item.

3. The computer-implemented method of claim 1, wherein determining whether the first content item was incompletely rendered based at least in part on the screenshot image further comprises:
    determining, by the computing system, that a percentage of white pixels in the screenshot image satisfies a threshold percentage; and
    determining, by the computing system, that the first content item was incompletely rendered based at least in part on the threshold percentage of white pixels.

4. The computer-implemented method of claim 1, wherein determining whether the first content item was incompletely rendered based at least in part on the screenshot image further comprises:
    determining, by the computing system, that a percentage of black pixels in the screenshot image satisfies a threshold percentage; and
    determining, by the computing system, that the first content item was incompletely rendered based at least in part on the threshold percentage of black pixels.

5. The computer-implemented method of claim 1, wherein determining whether the first content item was incompletely rendered based at least in part on the screenshot image further comprises:
    determining, by the computing system, that a percentage of colored pixels in the screenshot image satisfies a threshold percentage; and
    determining, by the computing system, that the first content item was incompletely rendered based at least in part on the threshold percentage of colored pixels.

6. The computer-implemented method of claim 1, wherein determining whether the first content item was incompletely rendered based at least in part on the screenshot image further comprises:
    determining, by the computing system, a first percentage of white pixels, a second percentage of black pixels, and a third percentage of colored pixels in the screenshot image;
    determining, by the computing system, a score based at least in part on the first percentage, the second percentage, and the third percentage; and
    determining, by the computing system, that the first content item was incompletely rendered based at least in part on the score.

7. The computer-implemented method of claim 1, wherein determining whether the first content item was incompletely rendered based at least in part on the screenshot image further comprises:
    identifying, by the computing system, at least one error message in the screenshot image; and
    determining, by the computing system, that the first content item was incompletely rendered based at least in part on the error message.

8. The computer-implemented method of claim 1, wherein obtaining data corresponding to the first content item further comprising:
    identifying, by the computing system, a source of the first content item; and
    determining, by the computing system, that the source has published at least one other content item that was previously determined to be incompletely rendered for display.

9. The computer-implemented method of claim 8, the method further comprising:
    obtaining, by the computing system, one or more thresholds corresponding to the source, the thresholds to be used for determining whether the first content item is incorrectly rendered.

10. A system comprising:
    at least one processor; and
    a memory storing instructions that, when executed by the at least one processor, cause the system to perform:
        obtaining data corresponding to a first content item;
        causing the first content item to be rendered for display;
        presenting the first content item through a display interface;
        capturing a screenshot image of the display interface while the first content item is being presented; and
        determining whether the first content item was incompletely rendered based at least in part on the screenshot image, the determining comprising:

identifying a largest region in the screenshot image including only pixels of a certain color; and determining that the first content item was incompletely rendered based at least in part on a size of the largest region.

11. The system of claim 10, wherein upon determining that the first content item was rendered incompletely, the system further performs:

generating a report describing the first content item, the report including at least the screenshot image and a Uniform Resource Locator (URL) referencing the first content item.

12. The system of claim 10, wherein determining whether the first content item was incompletely rendered based at least in part on the screenshot image further causes the system perform:

determining that a percentage of white pixels in the screenshot image satisfies a threshold percentage; and determining that the first content item was incompletely rendered based at least in part on the threshold percentage of white pixels.

13. The system of claim 10, wherein determining whether the first content item was incompletely rendered based at least in part on the screenshot image further causes the system perform:

determining that a percentage of black pixels in the screenshot image satisfies a threshold percentage; and determining that the first content item was incompletely rendered based at least in part on the threshold percentage of black pixels.

14. The system of claim 10, wherein determining whether the first content item was incompletely rendered based at least in part on the screenshot image further causes the system perform:

determining that a percentage of colored pixels in the screenshot image satisfies a threshold percentage; and determining that the first content item was incompletely rendered based at least in part on the threshold percentage of colored pixels.

15. A non-transitory computer-readable storage medium including instructions that, when executed by at least one processor of a computing system, cause the computing system to perform a method comprising:

obtaining data corresponding to a first content item;

causing the first content item to be rendered for display;

presenting the first content item through a display interface;

capturing a screenshot image of the display interface while the first content item is being presented; and determining whether the first content item was incompletely rendered based at least in part on the screenshot image, the determining comprising:

identifying a largest region in the screenshot image including only pixels of a certain color; and determining that the first content item was incompletely rendered based at least in part on a size of the largest region.

16. The non-transitory computer-readable storage medium of claim 15, wherein upon determining that the first content item was rendered incompletely, the computing system further performs:

generating a report describing the first content item, the report including at least the screenshot image and a Uniform Resource Locator (URL) referencing the first content item.

17. The non-transitory computer-readable storage medium of claim 15, wherein determining whether the first content item was incompletely rendered based at least in part on the screenshot image further causes the computing system perform:

determining that a percentage of white pixels in the screenshot image satisfies a threshold percentage; and determining that the first content item was incompletely rendered based at least in part on the threshold percentage of white pixels.

18. The non-transitory computer-readable storage medium of claim 15, wherein determining whether the first content item was incompletely rendered based at least in part on the screenshot image further causes the computing system perform:

determining that a percentage of black pixels in the screenshot image satisfies a threshold percentage; and determining that the first content item was incompletely rendered based at least in part on the threshold percentage of black pixels.

19. The non-transitory computer-readable storage medium of claim 15, wherein determining whether the first content item was incompletely rendered based at least in part on the screenshot image further causes the computing system perform:

determining that a percentage of colored pixels in the screenshot image satisfies a threshold percentage; and determining that the first content item was incompletely rendered based at least in part on the threshold percentage of colored pixels.

* * * * *